United States Patent Office 3,253,315
Patented May 31, 1966

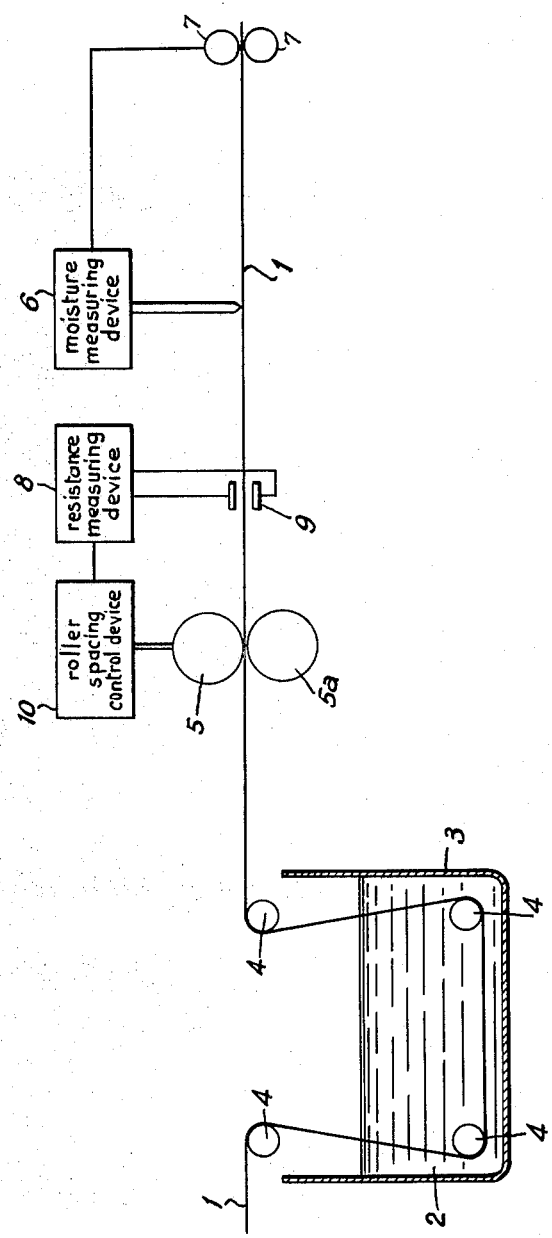

3,253,315
APPARATUS AND METHODS FOR THE CONTROL AND AUTOMATIC REGULATION OF THE PRESSURE OF SQUEEZING ROLLERS IN A CONTINUOUS PROCESS
Henri Eicken, 5 Chemin Malombre, Geneva, Switzerland
Filed Apr. 1, 1964, Ser. No. 356,565
Claims priority, application Switzerland, Apr. 26, 1963, 5,291/63
3 Claims. (Cl. 28—28)

The present invention relates to the control of squeezing rollers for adjusting the moisture content of material passed therethrough.

More particularly, the present invention relates to apparatus and methods for the control and automatic regulation of the pressure of squeezing rollers in a machine which is continuously processing a material such as textile, plastic or paper materials.

In various industries in which material is being continuously processed, it is necessary to incorporate into the material an aqueous solution of a product in a determined percentage. The procedure for introducing these products generally consists of continually passing the material into a solution containing the product and then squeezing the material by means of squeezing rollers which apply to the material a pressure corresponding to the percentage of the product which it is desired to retain in the material.

For example, in a sizing machine the percentage of sizing to be added to the warp threads of yarn depends on the one hand on the concentration of the solution of the sizing product through which the threads pass, which concentration is maintained constant by means of known devices, and on the other hand, on the pressure of the squeezing rollers and of the speed of advancement of the material. The speed of advancement of the material can be adjusted and is related to the percentage of moisture that is desired to be obtained in the warp threads at the exit of the machine. In modern machines this moisture content is controlled by apparatus which permits automatically varying the speed of the machine with the object of maintaining the determined rate of moisture. Machine speed variations are effected, however, in the course of working, for example, when the drying conditions change, such as following a change of temperature. Furthermore, it frequently happens that one or more threads break, in which case the machine is slowed down by the operator in order to permit the necessary repairs to be made. The speed of these machines can vary between 2 meters per minute and more than 80 meters per minute.

It is possible by preliminary empirical tests to determine the pressure to be applied to the squeeze rollers in order to retain, with a given concentration of size solution, a determined percentage of sizing product for a given speed. This percentage automatically varies when the speed changes, if at the same time there is not a corresponding regulation of the pressure of the squeezing rollers. It is impossible to make such a regulation of the rollers manually. It follows that when the speed of the machine is varied and the material is thusly advanced at varying speeds that the warp threads are sized irregularly, certain portions retaining too much size and other parts not enough, which causes breakage of the threads and results in considerable losses in the subsequent weaving processes.

Similar conditions are found in other industries, for example when it is desired to incorporate finishing products or dyestuffs into cloth, or of regulating the thickness of the layers of various products coated on paper or on a plastic material.

It is an object of the present invention to maintain a uniform final product in spite of variation of the speed of advancement of the material.

It is a further object of the invention to compensate for speed variation of the material in order to continuously produce a product of uniform characteristics.

It is a particular object of the invention to obtain a product having a uniform desired sizing content irrespective of the speed of advancement of the product through an aqueous solution and subsequent squeezing rollers.

The present invention is characterized by the measurement of the electrical resistance of the material after its passage between the squeezing rollers, and the regulation of roller pressure according to the measured electrical resistance.

A description of the method and apparatus therefor is given by way of example, for the particular case of a warp thread sizing machine as illustrated in the sole figure in the drawing, wherein the apparatus is diagrammatically shown.

The sheet of warp threads 1 passes into a tank 3 containing an aqueous solution 2 containing a desired rate of sizing which may be, for example, 12%. The concentration of this solution is maintained constant with the aid of known devices such as viscometers, and devices for the automatic circulation of the solution.

The sheet 1 is guided by rollers 4 to squeeze rollers 5, 5a, one of which may be fixed and the other movable, or both movable relative to one another. The material is passed through rollers 5, 5a and is squeezed thereby with a force related to the spacing between the rollers.

By empirical tests, a squeeze roller pressure permitting retention of a desired quantity of the 12% size solution on the threads at a given working speed is determined. The sizing machine includes apparatus 6 for measuring the amount of moisture content in the threads and comparing it with a determined percentage that it is desired to retain in the threads at the exit of the machine after drying, with the object of varying the machine speed when this percentage deviates for any reason from the determined value. The sheet 1 is advanced by the rollers 7 which engage the sheet at a location at which the sizing is dry. The speed of rollers 7 is controlled by moisture sensing apparatus 6 in known manner.

As an example, if the speed of advancement of the sheet is 50 meters per minute and the squeeze roller pressure is adjusted to retain the desired quantity of 12% size in the sheet, the warp thread sheet will be sized in a regular and perfect fashion. However, it frequently happens that one or more threads break and, in that event, the machine is slowed to a speed of only a few meters per minute in order to permit mending the broken threads. If during this slow running the squeeze roller pressure is maintained at the same pressure as at the normal machine speed of 50 meters per minute, the threads will be more completely squeezed and the quantity of retained size will be reduced considerably.

The solution 2 into which the threads pass is an aqueous one containing a certain percentage of chemical sizing products. In addition to the sizing products, the threads after squeezing contain about 60% to 80% of water. This relatively high water retention permits the passage of an electric current and, because of this, the measurement of the ohmic or electrical resistance of the sheet of warp threads can be effected. In the case of ordinary plain water, the electrical resistance varies only very little within the range of water percentages indicated above, however, when the water contains chemical products such as sizing products, a slight variation of the percentage of the products results in a considerable variation of the ohmic resistance.

The measurement of this resistance thus furnishes a simple and sure means of continuously determining the exact percentage of the sizing products on the threads.

In order to maintain the desired percentage, it suffices to use an electrical resistance measuring device 8 having measuring electrodes 9 mounted at the exit of the squeeze rollers. The device 8 is connected to the means 10 which moves the movable roller to control the spacing between the rollers to regulate the roller pressure according to the measured electrical resistance which is a function of the moisture content of the sheet of threads.

The means 10 may be of the kind shown in Swiss Patent No. 359,910.

Numerous modifications of the disclosed embodiment will become apparent to one skilled in the art while remaining within the scope of the invention as defined in the following claims.

What is claimed is:

1. Apparatus for applying a desired quantity of sizing to a sheet of threads, said apparatus comprising: a tank containing an aqueous solution of sizing material in a determined concentration, means for engaging the sheet of threads to draw the same along a path of advancement including passage through the solution in the tank, squeezing rollers located adjacent the tank and in said path for squeezing the sheet after the sheet passes through said solution, to expel solution therefrom, said rollers having an adjustable spacing to vary the degree of squeezing of the sheet and thereby the quantity of solution expelled therefrom, means for measuring the electrical resistance of the sheet as the same passes from said squeezing rollers which resistance is a function of the quantity of sizing solution on said sheet, means controlling the spacing of the rollers, means associating the means which measures the electrical resistance with the means for controlling the spacing of the rollers to cause the rollers to be spaced a distance corresponding to the quantity of solution to be expelled in order to leave a given constant quantity of solution in the sheet and means located beyond the means for measuring the electrical resistance to measure the quantity of solution in the sheet for controlling the means for drawing the sheet to vary the speed of advancement of the sheet so that a given quantity of sizing will be obtained in the sheet for a particular constant pressure applied to the sheet by the squeezing rollers, said means for engaging the sheet including a pair of rollers engaging the sheet at a location beyond the squeezing rollers whereat the sheet is dry and the sizing deposited thereon.

2. A method of producing treated material by drawing the material through a treating solution and then drawing the material through squeezing rollers which expel part of the solution from the material to leave the material with a particular moisture content and wherein the speed at which the material is drawn is adjusted for a particular desired moisture content and a particular degree of squeezing by the rollers, said method comprising adjusting the degree of squeezing of the material in the rollers to in turn adjust the quantity of solution expelled when the speed of drawing is changed by sensing the moisture content of the material immediately after passage thereof through the rollers, said degree of squeezing being adjusted to cause the material to be discharged from the rollers with a predetermined moisture quantity even at different speeds of drawing.

3. A method as claimed in claim 2 wherein said moisture content is sensed by measuring the electrical resistance of the material after the latter has just passed through the rollers.

References Cited by the Examiner

UNITED STATES PATENTS

| | | | |
|---|---|---|---|
| 2,671,942 | 3/1954 | Milne | 28—28 X |
| 2,976,600 | 3/1961 | Edgar | 28—28 |
| 2,992,626 | 7/1961 | Kabelitz | 28—28 X |

ROBERT R. MACKEY, *Primary Examiner.*

L. K. RIMRODT, *Assistant Examiner.*